US012543697B2

(12) United States Patent
Leslie

(10) Patent No.: US 12,543,697 B2
(45) Date of Patent: Feb. 10, 2026

(54) ANIMAL WASTE STATION

(71) Applicant: Dana Leslie, Austin, TX (US)

(72) Inventor: Dana Leslie, Austin, TX (US)

( * ) Notice: Subject to any disclaimer, the term of this patent is extended or adjusted under 35 U.S.C. 154(b) by 0 days.

(21) Appl. No.: 18/545,665

(22) Filed: Dec. 19, 2023

(65) Prior Publication Data

US 2025/0160292 A1 May 22, 2025

Related U.S. Application Data

(60) Provisional application No. 63/599,692, filed on Nov. 16, 2023.

(51) Int. Cl.
*A01K 1/01* (2006.01)
(52) U.S. Cl.
CPC .................. *A01K 1/0107* (2013.01)
(58) Field of Classification Search
CPC .... A01K 1/0107; A01K 29/005; A01K 29/00; G01G 17/08
See application file for complete search history.

(56) References Cited

U.S. PATENT DOCUMENTS

| | | | |
|---|---|---|---|
| 7,249,570 B1 | 7/2007 | Roberson | |
| 8,316,801 B1 | 11/2012 | Nottingham | |
| 8,336,494 B2 | 12/2012 | McElroy | |
| 8,914,923 B2 | 12/2014 | Smith | |
| 8,944,006 B2 | 2/2015 | Anderson | |
| 9,585,366 B2 | 3/2017 | Ault | |
| 9,737,045 B1 | 8/2017 | Scanlan | |
| 10,412,933 B2 | 9/2019 | Eom | |
| 11,337,403 B1 | 5/2022 | Michalopoulos | |
| 2006/0260559 A1 | 11/2006 | Fry | |
| 2016/0324121 A1* | 11/2016 | Rains | A01K 1/0107 |
| 2020/0042780 A1* | 2/2020 | Hori | A01K 1/0107 |
| 2020/0236897 A1* | 7/2020 | Hori | A01K 29/005 |
| 2020/0240830 A1* | 7/2020 | Asahara | G01G 17/08 |
| 2020/0245586 A1* | 8/2020 | Hiroshima | A01K 29/005 |
| 2021/0100215 A1 | 4/2021 | Phelps | |
| 2022/0248641 A1* | 8/2022 | Hori | A01K 1/015 |
| 2023/0068528 A1* | 3/2023 | Donavon | G16H 40/63 |
| 2023/0143669 A1* | 5/2023 | O'Dwyer | A01K 15/02 |
| | | | 340/573.3 |

FOREIGN PATENT DOCUMENTS

| | | | | |
|---|---|---|---|---|
| GB | 2240020 A | * | 7/1991 | .......... A01K 5/0291 |
| KR | 20210131728 A | * | 11/2021 | |

* cited by examiner

*Primary Examiner* — Joshua D Huson
*Assistant Examiner* — Alanna K Peterson
(74) *Attorney, Agent, or Firm* — EASTGATE IP; Scott R. Seeley

(57) ABSTRACT

Disclosed herein is an animal waste station configured to determine when an animal has entered the waste station and exited the waste station after elimination. In various embodiments, the animal waste station is configured to dispense a food item based at least in part on the foregoing determination. In various embodiments, the animal waste station and associated treat dispensing unit are integrally coupled to reduce the ability for tampering or chewing.

17 Claims, 7 Drawing Sheets

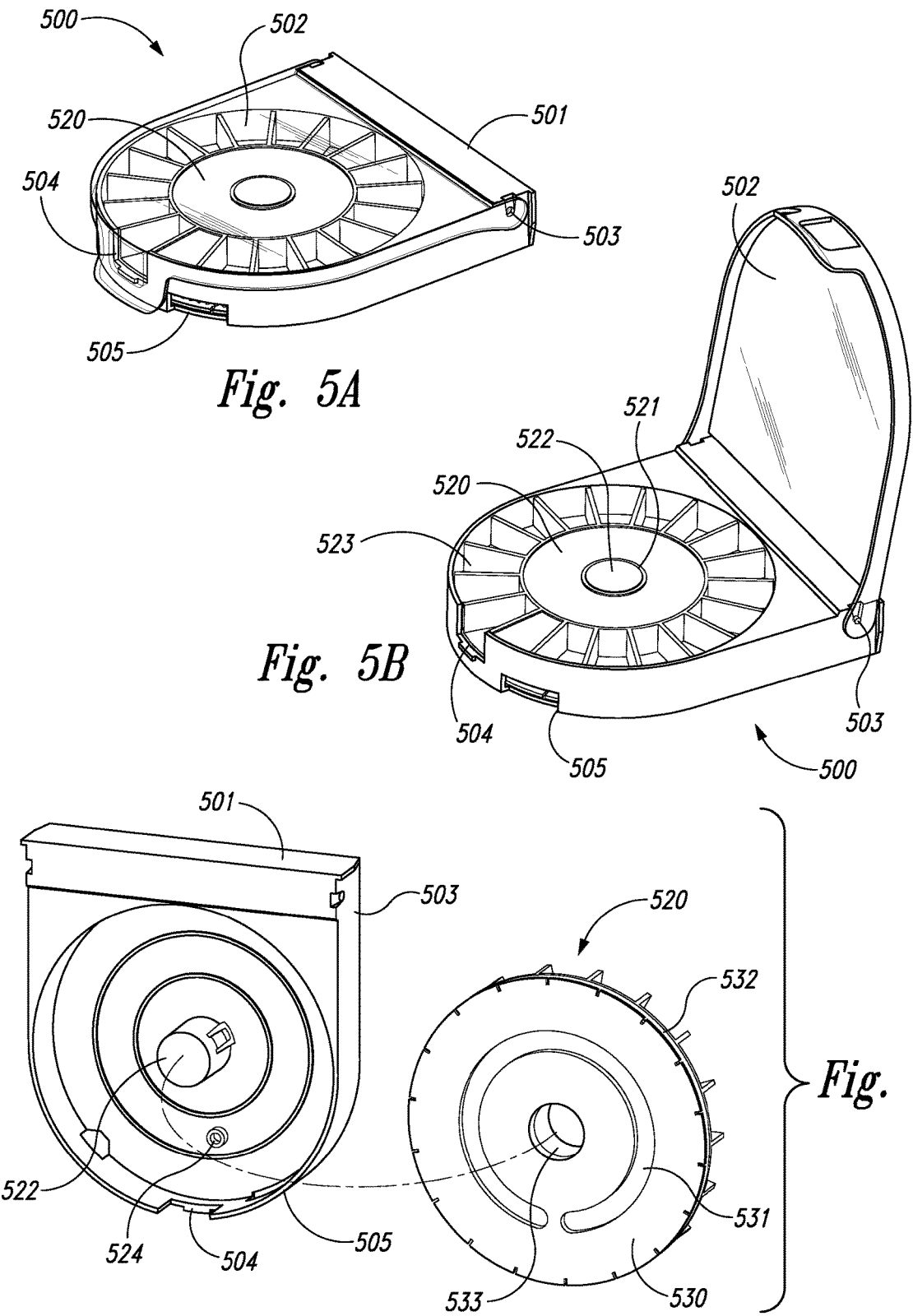

ANIMAL WASTE STATION

CROSS-REFERENCE TO RELATED APPLICATIONS

This application claims the benefit of U.S. Provisional Application Ser. No. 63/599,692 filed Nov. 16, 2023, which is incorporated by reference herein in its entirety.

SUMMARY

In various embodiments, the present disclosure relates to an animal tampering resistant animal waste station configured to detect animal entry, animal elimination, and animal exit while configured to provide a food item in response. A variety of aspects and features of the present disclosure are summarized below.

In some configurations, the tampering resistant animal waste station may comprise: a surrounding enclosure and an elimination area; wherein the surrounding enclosure configured to form a complete perimeter around an elimination area; wherein at least a portion of the surrounding enclosure extends over at least a portion of the top surface of the elimination area; wherein a lower portion of the surrounding enclosure fully encloses the underside of the elimination area; wherein the lower portion of the surrounding enclosure further includes a connecting segment extending beyond the perimeter of the elimination area; wherein the surrounding enclosure is further provided with a plurality of sidewalls extending vertically above the elimination area; wherein the plurality of sidewalls include a gap such that the sidewalls do not form a complete perimeter around the elimination area; wherein the elimination area is configured with multiple layers including: an absorbent layer configured to absorb moisture associated with elimination; a moisture impermeable layer configured to mitigate moisture egress; a support layer configured to facilitate an interface between the elimination area and a plurality of sensors configured to detect elimination; a food item dispensing unit configured to house food items securely away from animal access and further configured to interface with a food item containing cassette; the food item dispensing unit configured to couple with the animal tampering resistant animal waste station through the connecting segment of the lower portion of the surrounding enclosure; the food item dispensing unit including an opening to receive a food item containing cassette; wherein the food item dispensing unit opening is disposed proximate to the side of the food item dispensing unit that is adjacent to the surrounding enclosure; the food item dispensing unit including internal gears configured to operatively couple with the food item containing cassette; wherein the food item containing cassette includes a hinged housing and an internal rotating member having a plurality of slots configured to house a food item through a slot in the hinged housing.

In some embodiments, the absorbent pad is disposable. In some configurations the vertical walls have a height of about 8-18 inches. Likewise, in various embodiments the portion of the surrounding enclosure extending over at least a portion of the top surface of the elimination area extends about 3 inches to 8 inches over the top surface along the perimeter of the elimination area.

In some configurations a slope is formed between the vertical walls and the portion of the surrounding enclosure extending over at least a portion of the top surface of the elimination area such that liquids are routed down the vertical walls, down the slope and onto the elimination area.

As such, in various embodiments the support layer configured to facilitate an interface between the elimination area and a plurality of sensors configured to detect elimination includes a flexible lattice structure configured to interface with the plurality of sensors.

the plurality of sensors may include a series of weight sensors. In some implementations the elimination area is substantially square, and the series of weight sensors includes four weight sensors. The four weight sensors may be evenly distributed within a margin of about 30% of each of the four corners of the substantially square elimination area.

In some instances, each of the four weight sensors includes an outer housing, the outer housing configured to interface with a support layer to facilitate an interface between the elimination area and the four weight sensors.

Likewise, in various configurations the outer housing of each of the four weight sensors is substantially square and configured to surround a sensor plunger to provide a gap between the sensor plunger and the outer housing; the substantially square outer housing including a notch in the top surface of each of the four sides; wherein each of the notches is configured to interface with a single member of the flexible lattice structure of the support layer; and wherein four members of the flexible lattice structure are configured to interface with the gap between the sensor plunger and the outer housing In some embodiments the pad support tray is configured to float over the sensors to reduce the persistent weight across the sensors.

In still further configurations the cassette includes a plurality of segments configured to house one or more food items. For instance, the plurality of segments can be configured to house one or more food items includes 23 segments. In various configurations the hinged housing of the food item containing cassette includes two internal access ports including a first internal access port providing access to one of the plurality of segments and a second internal access port providing access to notches disposed on the internal rotating member.

In some implementations the food item dispensing unit includes gears configured to interface with the notches disposed on the internal rotating member of the cassette through the second access port in the housing of the cassette.

In still further implementations the food item dispensing unit includes a sensor to determine the type or presence of food item housed within one of the plurality of segments of the cassette.

In some aspects, a method for detecting and rewarding animal elimination using a tamper resistant animal waste station having a waste area configured with a plurality of weight sensors is disclosed. In some embodiments the method may comprise: determining a first baseline weight of the waste area through the plurality of weight sensors; monitoring the weight of the waste area through the plurality of weight sensors; detecting a substantial increase of the waste area with respect to the determined baseline weight through the plurality of weight sensors; monitoring the substantially increased weight of the waste area through the plurality of weight sensors to detect a substantial decrease in weight; responsive to detecting a substantial decrease in weight, determining a second baseline weight of the waste area through the plurality of weight sensors; comparing the second baseline weight to the first baseline weight to determine whether an animal has eliminated in the waste area; and responsive to determining that an animal has eliminated in the waste area, cycling a cassette.

In such configurations the cassette may include a plurality of segments, each of the plurality of segments may contain a food item such that cycling the cassette may dispense none, one, or more food items.

In still further aspects the present disclosure relates to automatic animal waste station configured to detect the entry, elimination, and exit of an animal, the waste station comprising: an elimination area; a surrounding enclosure; a plurality of weight sensors; wherein the waste station is configured to determine a first baseline weight of the elimination area; wherein the waste station is configured to monitor the weight of the elimination area; wherein the waste station is configured to detect a substantial increase in the weight of the elimination area; wherein the waste station is configured to monitor for a substantial decrease in the weight of the elimination area to obtain a second baseline weight; wherein the waste station is configured to compare the first baseline weight to the second baseline weight to determine whether an animal has eliminated within the elimination area; and in response to determining that an animal has eliminated within the elimination area, cycling a cassette which may provide no food item, one food item, or a plurality of food items.

BRIEF DESCRIPTION OF DRAWINGS

Various embodiments are depicted in the accompanying drawings for illustrative purposes and should in no way be interpreted as limiting the scope of the embodiments. Various features of different disclosed embodiments can be combined to form additional embodiments, which are part of this disclosure.

FIGS. 5A-C depict a treat cassette for use in conjunction with a treat dispensing unit for use with a dog waste station as described in accordance with certain embodiments of the present disclosure.

DETAILED DESCRIPTION OF CERTAIN EMBODIMENTS

Field

Figure 1A:
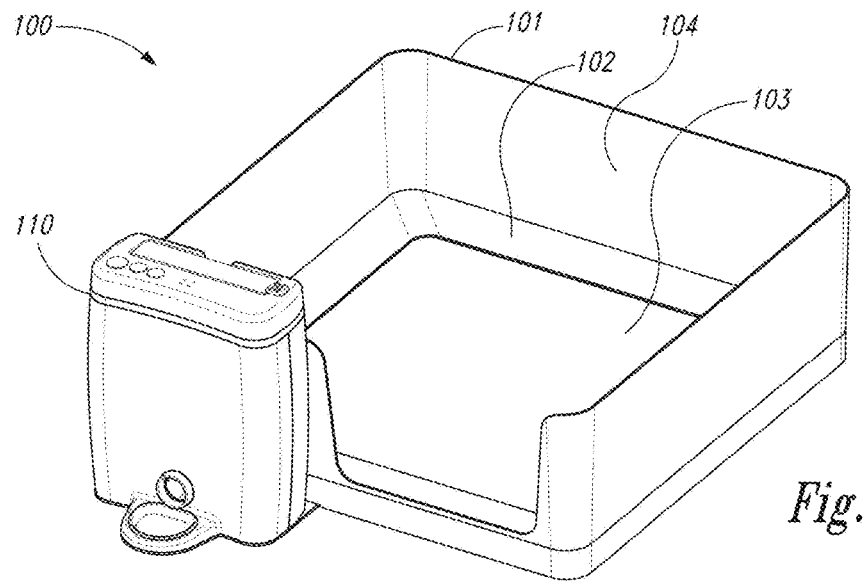
FIGS. 1A-B depict a dog waste station as described in accordance with certain embodiments of the present disclosure.

The present disclosure generally relates to animal waste stations, including pet waste stations configured for household use.

BACKGROUND

Various pet elimination areas have been introduced for homes. However, these elimination areas are associated with significant drawbacks and fail to meet the needs of many uses. For example, although litter boxes can be used for a variety of animals, most are made for cats. Litter boxes can be a suitable solution for cats for multiple reasons. Cats tend to squat to eliminate, and moreover tend to bury their waste and are predisposed to eliminating in an area where they can comfortably bury their waste meaning that they have a natural inclination to use their assigned waste station. This scenario presents different obstacles for containing the associated mess in comparison to the obstacles that exist for other animals, such as dogs.

Dogs are substantially larger than other domestic animals, such as cats. Their size presents unique challenges for developing a suitable elimination area. Furthermore, dogs have different elimination patterns than other domestic animals such as cats. For example, especially male dogs have a tendency to lift their legs to eliminate onto obstacles. This propensity, coupled with their size, can make it difficult to contain the mess caused by elimination.

Furthermore, dogs must be motivated to use the waste station and eliminate in the proper area. However, training requires consistency and a waste station that requires an owner to constantly monitor whether the animal has used the station and then manually reward the animal can lead to problems down the road. Housing treats within the unit and automatically dispensing treats from the unit requires development to determine how to house the treats without allowing access to the treats at inappropriate times. This consideration holds especially true with respect to dogs which can be destructive in their attempts to obtain treats or food items.

Some litter boxes attempt to detect waste based on electrical resistance within the device. However, these devices cannot detect feces and present cost and design challenges to produce and use.

OVERVIEW

Disclosed herein are various embodiments of certain pet waste stations. Many of the systems, examples, and methods disclosed herein exhibit certain desired improvements. These illustrative examples are not intended in any way to restrict the general disclosure presented or the various aspects and features described herein. Furthermore, the general principles described herein may be applied to embodiments and applications other than those specifically discussed herein without departing from the spirit and scope of the disclosure. This disclosure is not limited to any particular embodiment shown, but is instead to be accorded the widest scope consistent with the principles and features that are disclosed or suggested.

Although certain aspects, advantages, and features are described herein, it is not necessary that any particular embodiment include or achieve any or all of those aspects, advantages, or features. Some embodiments may not achieve the advantages described herein but may achieve other advantages instead. Any structure, feature, or step in any embodiment can be used in place of, or in addition to, any structure, feature, or step in any other embodiment, or omitted. This disclosure contemplates all combinations of features from the various disclosed embodiments. No feature, structure, or step is essential or indispensable.

Figure 1B:
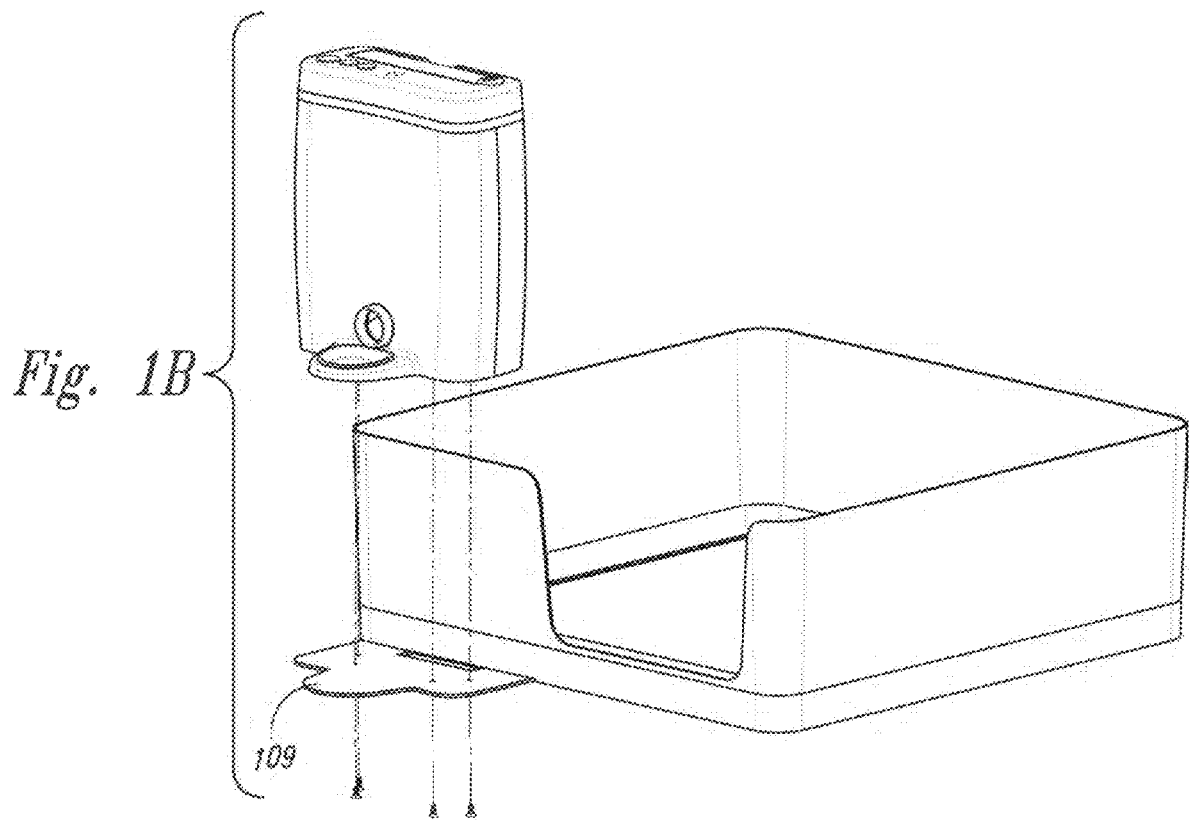

Pet Waste Station (FIGS. 1A and 1B)

FIGS. 1A and 1B schematically illustrate an embodiment of an animal waste station 100. To facilitate presentation, the animal waste station 100 may be discussed in connection with certain uses in conjunction with certain pets, such as for use with dogs. However, it will be appreciated that various embodiments can be applied in many other contexts as well, such as with respect to cats or other household or domestic animals. In some configurations the device may be sized and weighted according to a preferred embodiment. For example, some implementations suitable for use with large dogs may have a weight ranging from about 5 pounds to about 50 pounds. In some particularly advantageous embodiments, the waste station may have a weight of about 10 pounds to about 20 pounds, or 30 pounds to about 40 pounds, or any value therein.

The embodiment of the animal waste station 100 shown in FIGS. 1A and 1B includes a waste area 103 configured for pet elimination. The waste area 103 is encircled by a surrounding enclosure 101 which in the depicted embodiment comprises vertical walls 104.

The vertical walls 104 of the surrounding enclosure 101 are implemented with a height configured to contain a usual mess incident to animal elimination. For instance, canines often lift their legs to urinate, often onto obstacles. Advantageously, the present embodiment has been provided with higher sidewalls 104 than would be provided for other animal embodiments, such as those primarily configured for use by felines or other domestic animals. For instance, in some configurations the pet waste station may be manufactured having a wall 104 height of about 8-28 inches relative to the waste area 103 surface. In some particularly advantageous embodiments the wall 104 height may be about 14 inches as measured from the surface of the waste area 103. The surrounding wall 104 need not surround the entire enclosure. In some embodiments, a portion of the surrounding wall 104 may be cut away or otherwise omitted to provide an animal with access to the interior of the unit.

In various configurations, such as the embodiment depicted in FIGS. 1A and 1B, the walls 104 of the surrounding enclosure 101 are designed such that they do not rest over any weight sensors that may be disposed within the waste station 100. Furthermore, the surrounding enclosure 101 is further provided with a unique funnel and slope portion 102 adjacent to the waste area 103 surface. The sloped portion 102 of the surrounding enclosure 101 can be implemented to keep liquids contained in the waste area 103 and simultaneously away from the electronics that may reside within the waste station 100. For instance, as shown in FIG. 1A, the surrounding enclosure 101 includes walls 104 extending vertically and also includes the slope portion 102 extending inwards over a portion of the waste area 103 of the waste station 100. This sloping configuration keeps liquids inside the station and on the waste area 103 while keeping liquids away from electronics housed within the station 100.

Also depicted in FIG. 1 is a treat dispensing unit 110. As shown in FIG. 1, the treat dispensing unit 110 is securely coupled to the pet waste station 100. Notably, in the embodiment shown in FIGS. 1A and 1B, the treat dispensing unit 110 is not affixed to a lateral portion of any sidewall 104—rather, the treat dispensing unit is rather affixed to a ground plate connected to the underside of both the dispensing unit 110 and remainder of the animal waste station 100 as shown in FIG. 1B through the use of an undermount connecting plate 109. This unique configuration helps reduce the likelihood of tampering with the treat dispensing unit, since the connection point is contained beneath the animal waste station 100 reducing access to the connection point and reducing the risk of tampering or chewing. Such an undermount and tamper resistant configuration is particularly advantageous for embodiments that are particularly useful for use or training with a subset of animals that are more prone and capable of tampering and chewing, such as large dogs which are more capable of destructive tampering and chewing than other domestic pets that tend to make use of animal waste stations, such as felines.

In various configurations, the animal waste station can be a wholistic health solution configured to monitor the health, elimination, and behavioral patterns of one or more animals. For example, in various implementations the animal waste station can be provided with a plurality of smart features, including wireless connectivity such as Bluetooth or WiFi for communication with an external device or network. In some embodiments, the animal waste station can be provided with access to various APIs and third party software suites, such as Google Voice Assistant or Amazon Alexa. Through the aforementioned connective capabilities, the device can be configured for remote operation through a connected or networked device, such as a smartphone. Furthermore, data obtained by the station can be uploaded to another device or network location for remote access and storage.

Figure 2:
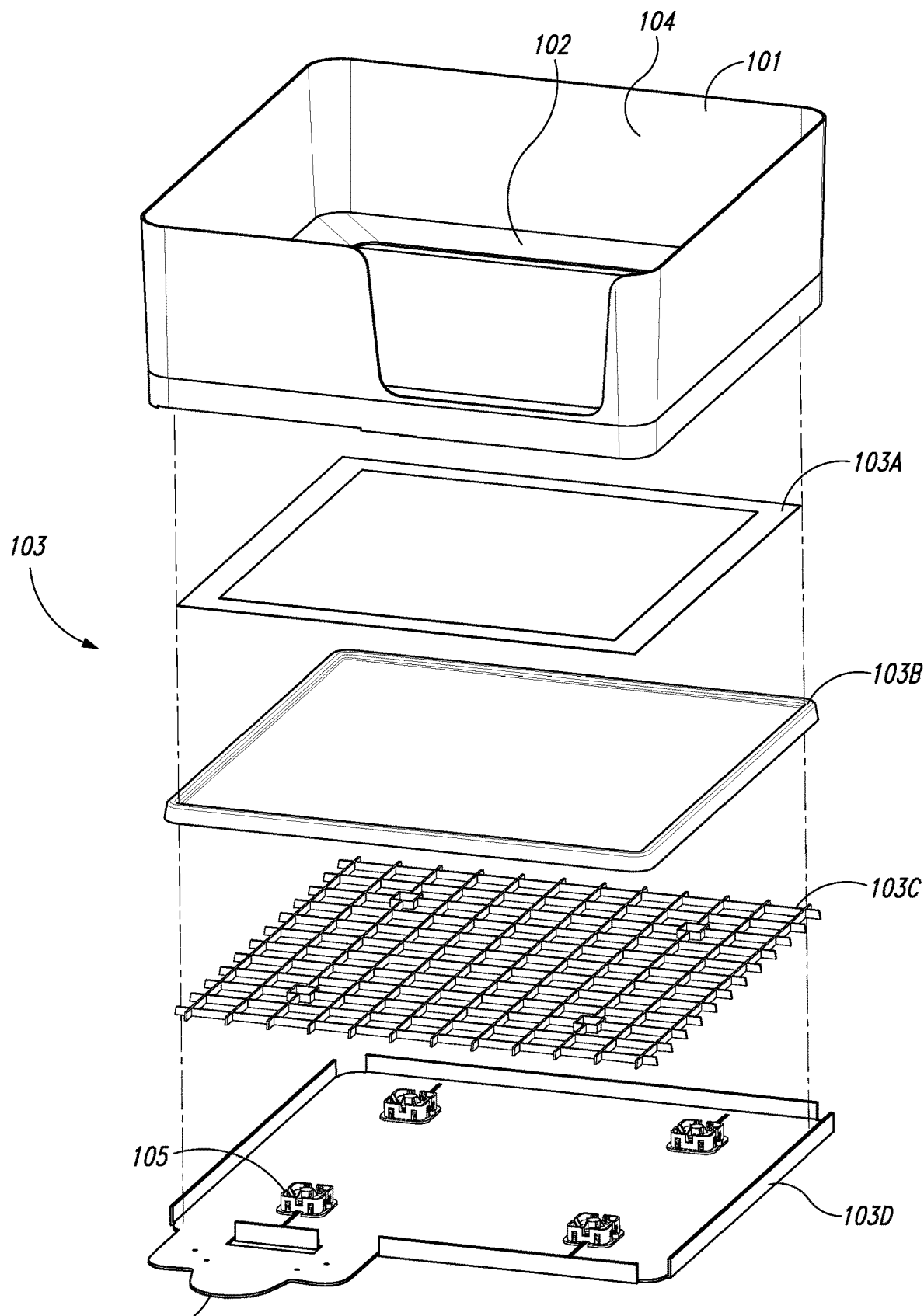
FIG. 2 depicts an exploded view of a dog waste station as described in accordance with certain embodiments of the present disclosure.

Waste Area and Surrounding Enclosure (FIG. 2)

The animal waste station 100 includes various components configured to facilitate and enable some of the functionality of the present device. As discussed above, the animal waste station 100 includes a surrounding enclosure 101 to mitigate the likelihood of an animal eliminating and creating a mess outside the enclosure. The pet waste station also includes a waste area 103 configured for pet elimination. The waste area 103 is depicted in FIGS. 1A and 1B, and view of the pet waste station 100 with an exploded view of the waste area 103 is shown in FIG. 2.

FIG. 2 depicts one particularly advantageous embodiment of a waste area 103 for use with a pet waste station 100 prepared in accordance with the present disclosure. As shown in FIG. 2, the waste area 103 comprises an absorbent pad 103A. The absorbent pad 103A is configured to absorb and retain any mess caused by animal elimination, such as urination or defecation. The absorbent pad 103A shown in the depicted embodiment is 22 inches×22 inches. Nevertheless, it will be appreciated that a wide variety of different sizes may be utilized depending on the embodiment. For instance, in some configurations the absorbent pad 103A may be prepared to have any reasonable size, such as about 12 inches, 24 inches, 32 inches, 48 inches, or any size therein. The absorbent pad 103A, and by extension, the animal waste station 100, may be fabricated at any reasonable size useful for a variety of animals and in a variety of shapes—it is not necessary that the device be square. For example, in some embodiments, the waste area 103 may be about 32 inches by about 48 inches, while in other embodiments, the waste area 103 may be about 24 inches by about 24 inches. The absorbent pad may be prepared from any of a variety of moisture absorbing or wicking materials including superabsorbent polymers (SAPs), cellulose fiber or pulp, fluff pulp, polypropylene, polyester, rayon, cotton, bamboo, wool, nylon or the like.

The waste area 103 of the animal waste station 100 further comprises a pad tray 103B. The pad tray 103B can be configured to provide a moisture resistant layer beneath the absorbent pad 103A. In this manner, any mess caused by animal elimination can be contained within the waste area 103 of the animal waste station 100, trapping moisture within the absorbent pad 103A, and preventing the egress of moisture into the rest of the animal waste station 100. In various configurations, the pad tray 103B may be prepared from a variety of moisture resistant materials such as rigid plastics including ABS, nylon, Delrin, Acetal, PVC, polyethylene film, vinyl upholstery fabric, PVC-coated polyester, tyvek, rubberized fabrics, neoprene, or the like. In some embodiments, different materials may be utilized such as a metallic sheet comprising aluminum or steel. The pad tray 103B may be shaped and sized substantially identical to the absorbent pad 103A laid over top.

In various configurations, a support layer 103C may be implemented beneath the pad tray 103B.

The support layer 103C is configured to support the absorbent pad 103A, the pad tray 103B, and to facilitate an interface with a sensor assembly to improve accuracy, improve resiliency, and reduce the likelihood of malfunction, error, or damage to the animal waste station 100. The support layer 103C can be disposed beneath the pad tray 103B and above the base plate 103D of the waste station 100. The support layer 103C can be implemented in a variety of forms. The support layer 103C depicted in the embodiment shown in FIG. 2 is implemented as a flexible mesh support structure configured to interface with the base plate 103D of the waste station 100. The support layer 103C helps to further prevent inadvertent movement of the waste area 103 with respect to the rest of the waste station 100. Furthermore, the support layer 103C helps to float and evenly distribute the weight of the waste area 103 over any sensors that may be disposed within, on top of, or with respect to the base plate 103D of the waste station 100. Some aspects of the support layer 103C will be further discussed with respect to FIG. 4.

Further depicted in FIG. 2 is the base plate 103D of the waste station 100. As shown in FIG. 2, the base plate 103D of the waste station 100 provides a base for the waste station 100 to be built upon. The base plate 103D depicted in FIG. 2 includes a connecting member 109 for connecting a dispensing unit 110 to the waste station 100. Furthermore, the base plate 103D shown in FIG. 2 is provided with a series of load sensors 105.

The embodiment depicted in FIG. 2 shows four load sensors 105, however, it will be appreciated that more or fewer load sensors may be implemented with respect to the same or different embodiments. However, the inventor of the present disclosure has identified that implementing four sensors disposed as shown provides certain advantageous with respect to the present implementation. Specifically, the use of four sensors disposed in the layout depicted improves the accuracy and resiliency of the device for measuring both small and large weights regardless of where the weight is distributed across the waste area 103.

Figure 3A:
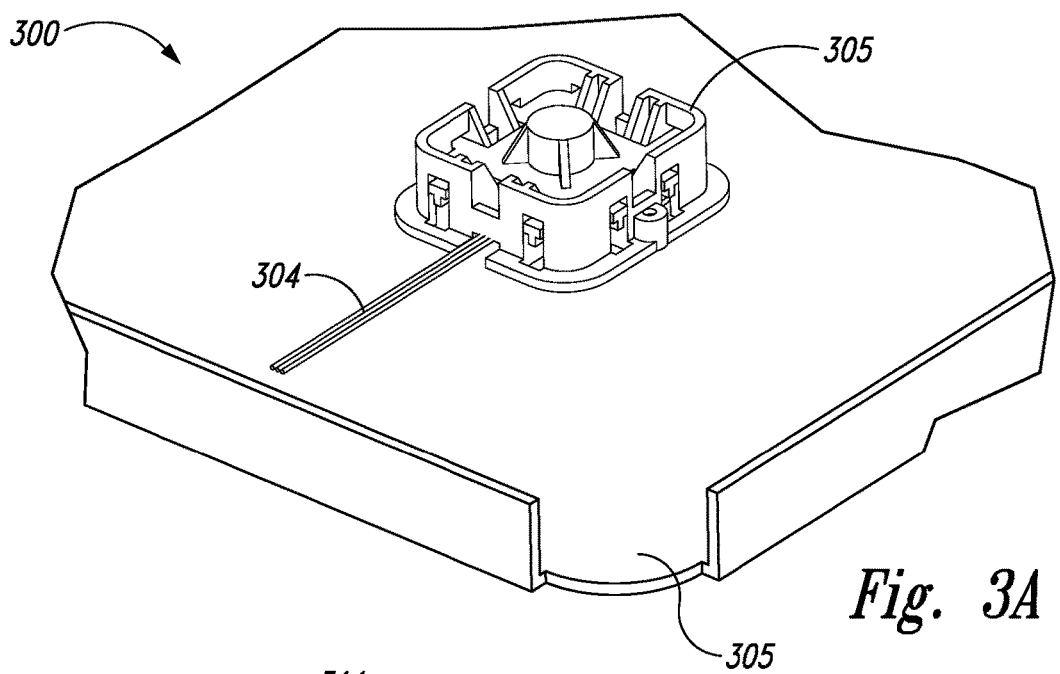
FIGS. 3A-B depict a sensor assembly and an exploded view of a sensor assembly configured for use in conjunction with a dog waste station as described in accordance with certain embodiments of the present disclosure.

Sensor Assembly (FIGS. 3A and B)

Figure 3B:
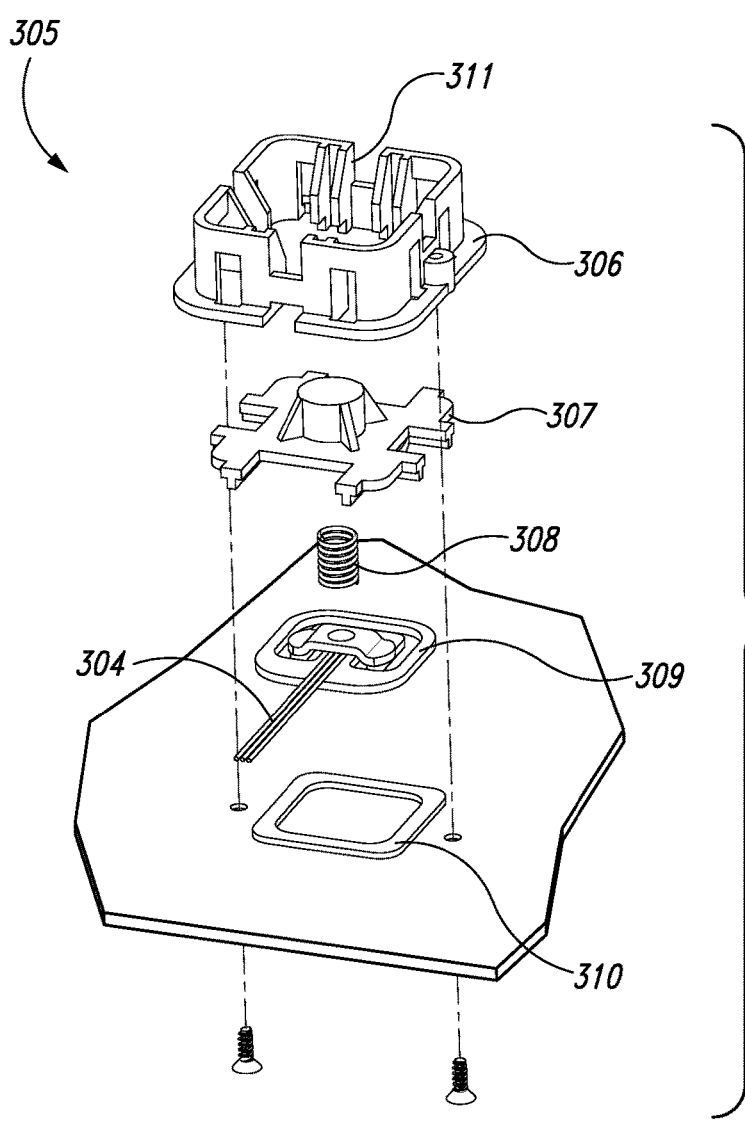

FIGS. 3A and 3B depict a suitably sensor assembly for use with the present animal waste station 100. The sensor assembly depicted in FIGS. 3A and 3B can be utilized to determine whether an animal has entered the waste station 100. Likewise, the sensor assembly depicted in FIGS. 3A and 3B can be utilized to determine whether an animal has exited the waste station 100 and left waste behind.

FIG. 3A depicts an embodiment of a suitable sensor assembly 300 that may be implemented with respect to the presently disclosed animal waste station 100. The sensor assembly 300 includes a load sensor 305 mounted on a base plate 303 with sensor wires 304 routed there along. The depicted embodiment presents several advantageous features over existing products.

More specifically, sensor assembly 300 shown in FIGS. 3A and 3B is disposed on top of a base plate 303 that may serve as the bottom-most layer of the animal waste station 100. The base plate 303 may be the same as the base plate 103 depicted in FIGS. 1 and 2. FIG. 3A shows that the sensor assembly 300 may be disposed on top of the base plate 303 and that the wires 304 of the sensor assembly 300 may be routed there along. By routing the wires 304 of the sensor assembly 300 along a surface of the base plate 303 the wires 304 can be kept within the interior of the unit and away from any animal that may use the waste station 100.

The above disclosed configuration reduces the likelihood of destructive tampering or chewing. This configuration is particularly useful for a chew-prone embodiment, such as an animal waste station configured for use with chew-prone animals and where the waste station is configured to dispense treats that would otherwise increase an animal's inclination for chewing or tampering with the device to gain access to the treats contained therein.

FIG. 3B depicts an exploded view of a load sensor 305. As shown in FIG. 3B, a load sensor 305 may include: a sensor housing 306; a sensor plunger 307; an overload spring 308; a load sensing unit 309; and a sensor standoff 310. The components of the load sensor 305 enable the unit to achieve the desired functionality and provide advantages over existing implementations.

For instance, the animal waste station 100 disclosed herein is configured to be gram-scale sensitive to changes in weight. However, the animal waste station 100 is also configured for use with a wide variety of animals having a wide variety of weights and elimination habits. As such, the number, positioning, and build of the load sensors depicted herein have been selected to enable this functionality.

Specifically, the sensor housing 306 is configured to interface with the support pad 103C discussed above. In this manner, any weight laid across the waste area 103 is distributed across each of the implemented load sensors 305. The sensor housing 306 includes grooves 311 that are configured to interface with the pad support 103C. The interface can be effective to float the weight of the waste area 103 over the sensor 305, including the sensor plunger 307. An overload spring 308 is provided to reduce the propensity of an unexpectedly large weight from damaging the load sensing unit 309. Likewise, a sensor standoff 310 is implemented to reduce the likelihood of damaging the unit in the event that unexpectedly large weight is disposed across the waste area 103, such as a large dog jumping into the station or an adult or child stepping into the waste area 103. The load sensing unit 309 is prepared such that any wires are routed along the base plate 303 of the unit to avoid the likelihood of tampering or chewing damaging the electrical connections between components.

It will be appreciated that a wide range of various sensing devices can be included to provide additional or further advantageous features. For example, in some implementations the waste station may include a sensing apparatus configured to detect, sense, or otherwise read a pet microchip. By identifying a pet microchip, data obtained by the station can be tied to a specific pet. The sensing apparatus may be disposed in the base of the unit, such as within or beneath the waste area of the waste station. However, in other configurations, the sensing apparatus may be disposed in an arm or other protruding member that extends above the entryway of the waste station. In still further configurations, a sensing apparatus may be implemented within one or more of the side walls. Advantageously, a waste station provided with one or more of the aforementioned sensing apparatuses can be configured to determine the identity of the pet using the unit. Determining the identity of the pet using the unit can be leveraged to provide additional useful functionality. For instance, the station can be configured to precisely and accurately measure an animal's waste. This measurement can provide valuable insights into the health and elimination patterns of an animal, such as a household pet. This can be particularly useful since many ailments can be identified through changes in an animal's elimination habits.

This data can be collected through a variety of mechanisms. In some configurations, the waste station can be provided with a memory for storing information and a mechanism for communicating stored information to another device. Suitable memory may include one or more of a non-transitory storage medium such as a hard disk drive or a solid-state drive. The device may also be provided with a mechanism for communicating stored information to another device through a wired protocol such as ethernet or USB connections, or with wireless communication capabilities such as Wi-Fi, Bluetooth, radio, NFC, IR, or similar wireless communication.

In this manner, information collected by the device may be stored and transmitted to another device, such as a computer or similar computerized device such as a mobile phone. As such, an owner can view a wide range of information about their animal and its elimination habits and general welfare. For instance, the data can be synced in real time to provide real time data and personalized health reports. Likewise, the system can be configured to help an owner obtain recommendations to improve their animal's welfare through personalized recommendations based on waste composition to ensure optimum nutrition. Likewise, the system can be configured to store, record, and communicate activity trends to understand the anima's daily routines and behaviors. By leveraging different sensing capabilities of the device, the system can determine which animal is using the device and provide individualized reports. For instance, the system may determine which animal of a plurality of household animals has used the waste station based on an identifiable characteristic, such as a measured weight of the animal, or a measured response from a microchip to identify the animal using the system.

Figure 4A:
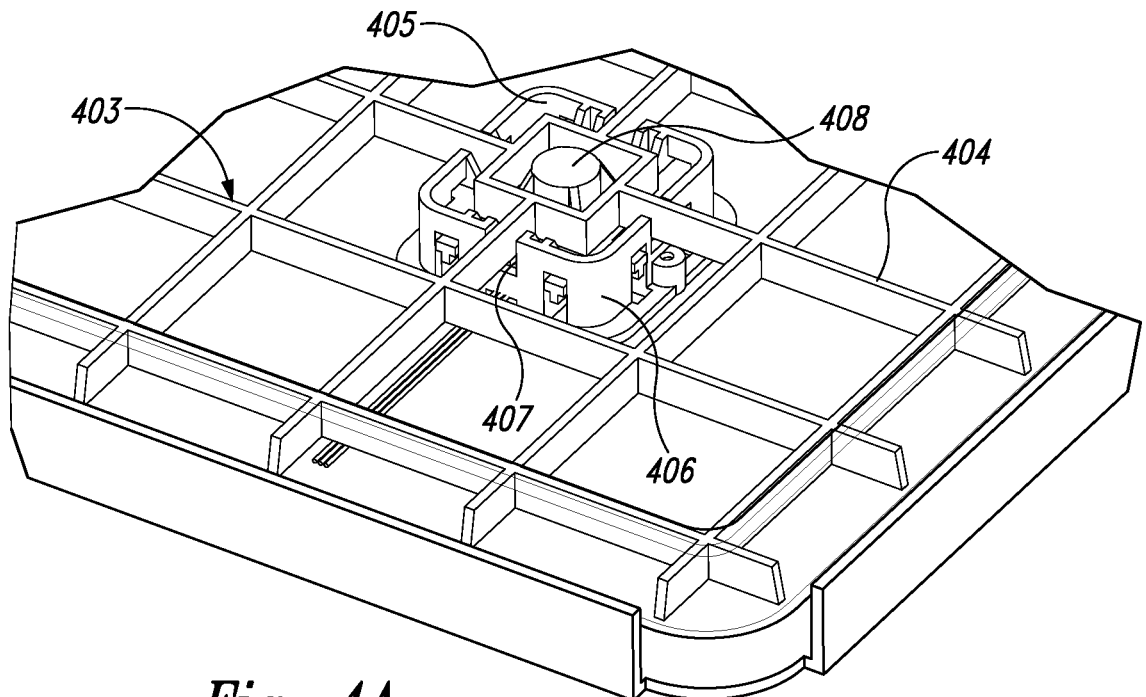
FIGS. 4A-B depict a waste station tray support platform and its associated interface with a sensor assembly.
Figure 4B:
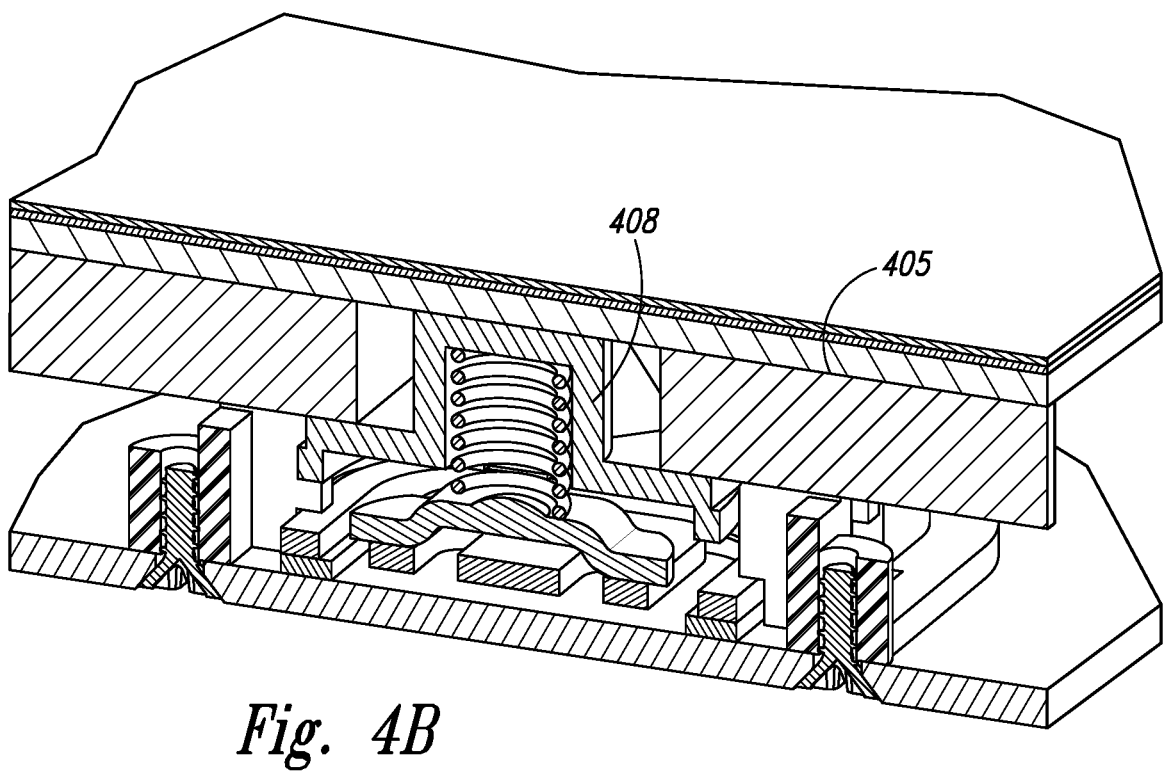

Sensor Assembly Interface with Support Layer (FIGS. 4A and 4B)

FIGS. 4A and 4B show how a load sensor can be configured to interface with a pad support tray to improve the accuracy of the weight detection system and to mitigate the likelihood of overloading the system with a large weight.

FIG. 4A depicts a pad support tray 403 including a pad support interface 405. The pad support tray 403 may be the same or different as pad support tray 103C depicted in FIG. 2. The pad support tray 403 depicted in FIG. 4A includes a grid structure 404 including sensor interface grid 405. The sensor interface grid 405 is configured to interface with sensor 406, which may be the same or different as sensor 305 shown in FIG. 3. Sensor 406 includes sensor housing grooves 407. The sensor housing grooves 407 are configured to interface with sensor interface grid 405 as shown in FIG. 4A. Specifically, the pad support tray 403 includes sensor interface grid 405. Sensor interface grid 405 is sized to fit between the sensor grooves 407 in the housing of sensor 406. Likewise, Sensor interface grid 405 is further configured to surround the plunger 408 of sensor 406.

As shown in FIG. 4A, the pad support tray 403 fits into the grooves 407 of the sensor 406 to reduce motion and displacement when an animal enters the waste station 100. Furthermore, the fit between the pad support tray 403 and the grooves 407 of the sensor 406 disperse the weight of the animal more evenly across the sensor array which results in a more precise measurement. Likewise, the pad support tray 403 and sensor 406 are arranged in such a way that the likelihood of overloading the sensor is greatly reduced.

FIG. 4B shows that the support tray 403 floats on the sensor plunger to evenly distribute the weight thereon.

Advantageously, as discussed above, the waste pad is spring loaded and floated over the sensor array so that the device is not resting on the weight sensors. This configuration improves accuracy of the system and extends the system lifetime since the sensors are not constantly under strain. Furthermore, this arrangement improves the ability of the system to withstand a wide variety of weights and also improves the accuracy of the system making it more sensitive to small scale changes in weight necessary to detect smaller amounts of animal elimination. The presently depicted sensor arrangement is configured to be sensitive to gram scale changes in weight disposed across the pad.

Treat Cassette (FIGS. 5A-C)

As discussed above, the pet waste station 100 can be configured to dispense treats from a treat dispensing unit. In various embodiments, the treat dispensing unit may be configured to interface with an easy to use, easy to clean, and easy to refill mechanism for loading and dispensing treats. In some configurations, a cassette style device may be utilized to load and dispense treats from the treat dispensing unit.

FIGS. 5A-C depict a suitable embodiment of a treat dispensing cassette assembly 500.

As shown in FIGS. 5A-C, the treat dispensing cassette assembly 500 includes a cassette housing 501 and inner cassette 520. The housing 501 is configured to enclose the cassette 520 and keep treats contained within. The housing 501 can be tamper or chew resistant and can be prepared from a variety of materials. In some embodiments, rigid polymers including plastic are utilized to reduce the likelihood of an animal chewing or tampering with the cassette 500. The cassette housing 501 may be configured to be opened to allow a user to insert treats into slots 523 of the cassette 520. In some configurations, the cassette housing 500 includes a cassette lid 502 and a hinge 503 allowing a user to actuate the lid 502.

The housing 500 may further include one or more openings. For example, in some configurations the housing 500 includes a dispenser opening 504. The dispenser opening 504 may allow for one or more treats to be dispensed from slots 523 of the cassette 520. The housing may also include an actuation opening 505. The actuation opening 505 can be configured to allow the cassette 520 to interface with gears or drive wheels disposed outside of the cassette, such as gears or drive wheels of a dispensing unit, in order to rotate the cassette and dispense treats therefrom.

As shown in FIG. 5B, the cassette 520 may be configured to have a plurality of different segments 523. The depicted embodiment is shown with 18 segments.

As shown in FIG. 5C, cassette 520 includes opening 533 configured to interface with a cassette housing protrusion 522. The cassette opening 533 provides space for the cassette housing protrusion 522 to protrude into the center of the cassette 520 allowing the cassette 520 to rotate thereabout. As the cassette 520 rotates about the cassette housing protrusion 522, treats housed within the segments 523 of the cassette 520 can be dispensed through the treat dispensing opening 504 of the cassette housing 501.

As shown in FIG. 5C, cassette 520 further includes a back side 530. The back side 530 of the cassette 520 includes a slot 531 configured to interface with the cassette housing rotation interface member 524. In this manner, the cassette 520 is stabilized against the cassette housing and rotates along the groove 531 implemented along the backing side 530 of the cassette 520.

With continued reference to FIG. 5C, the cassette back side 530 further includes a series of back side grooves 532 implemented along the edge of the cassette. The back side grooves 532 can be configured to interface with gears or drive wheels implemented on a treat dispensing unit configured to interface with the treat cassette assembly 500. For example, in some configurations, such as that depicted in FIGS. 5A-C, the cassette housing 501 may contain cassette actuation openings 505 configured to allow gears or drive wheels of a dispensing unit to interface with the back side grooves 532 implemented along the edge of the back side 530 of the cassette 520.

Figure 6A:
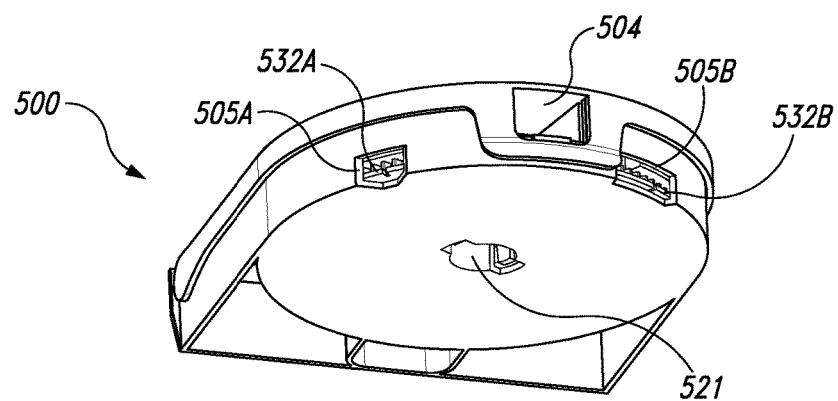
FIGS. 6A-C depict certain views of a treat dispensing unit and the associated interface with a treat dispensing cassette for use with a dog waste station as described in accordance with certain embodiments of the present disclosure.
Figure 6B:
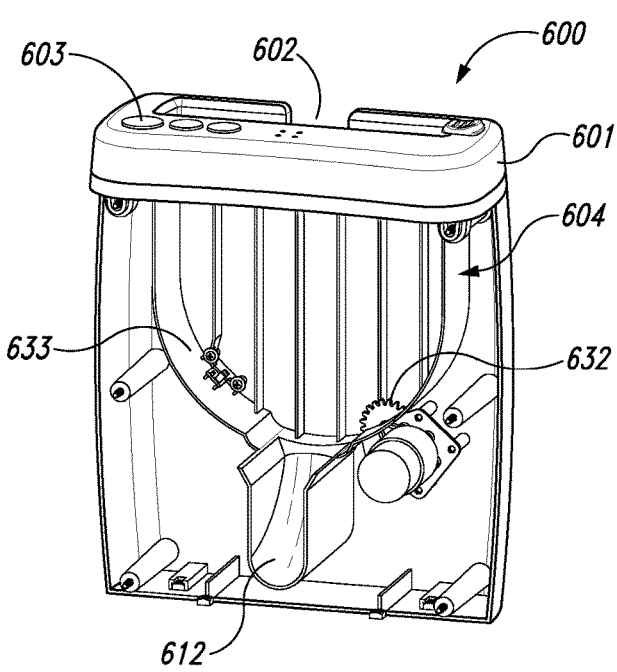
Figure 6C:
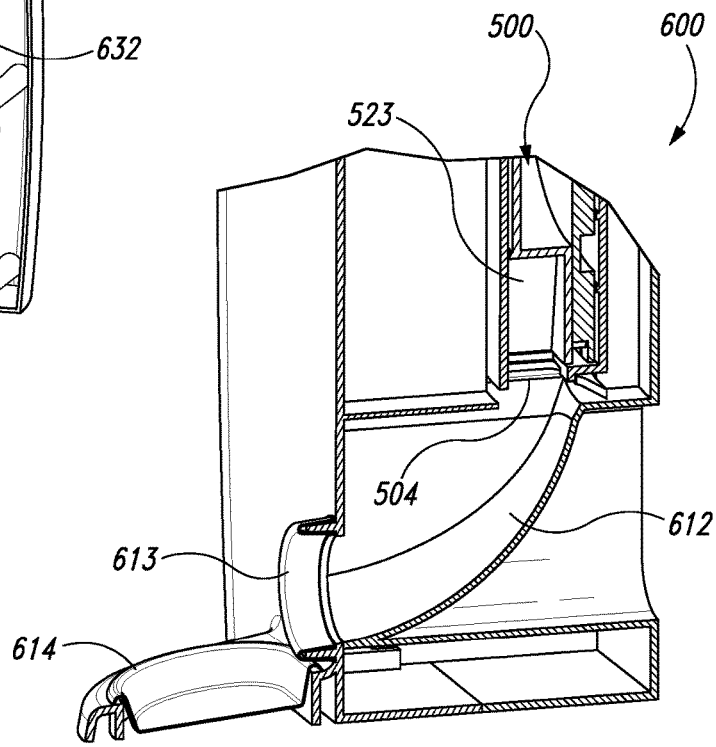

Dispensing Unit (FIGS. 6A-C)

FIGS. 6A-C depict a cassette assembly 500 in accordance with the present disclosure, a treat dispensing unit 600 in accordance with the present disclosure, and further depicts a suitable interface between the cassette assembly and treat dispensing unit.

FIG. 6A depicts a cassette assembly 500. Shown in FIG. 6A in association with the cassette assembly 500 is an inset 521 which can be the back side of the cassette housing protrusion 522 configured to interface with the center of the cassette 520.

Further depicted in FIG. 6A is the treat dispensing opening 504 configured to allow treats to be dispensed from segments 523 of the cassette 520.

Also depicted in FIG. 6A is two openings in the cassette housing 505A and 505B. The two openings 505A and 505 can be configured to facilitate an interface between the cassette 520 and the treat dispensing unit 600 and its associated housing 601.

Specifically, with reference to FIG. 6B, it is shown that the treat dispensing unit 600 may contain gears 632 configured to interface with the grooves in the backside of the cassette 532B. Likewise, the treat dispensing unit 600 may contain gears or other sensors configured to interface with a second portion 532A of the cassette 520 through opening 505A. Suitable sensors may be implemented along the second portion 532A of the cassette 520 and used to detect the presence or type of treat contained in a segment 523 of the cassette 520.

With continued reference to FIG. 6B, the treat dispensing unit 600 includes an opening 602 to receive a cassette assembly 500. The dispensing unit housing 601 includes an opening space 604 to receive a cassette assembly 500. The treat dispensing unit 600 further includes a treat chute 612 that allow treats to be dispensed from the unit 600.

FIG. 6C shows the interface between the cassette assembly 500 and the treat dispensing unit 600. Specifically, FIG. 6C shows that treats may be dispensed from a segment of the cassette 523 through a treat dispensing opening 504 of the cassette housing 501 to fall into a treat chute 612 of the dispensing unit, to be directed through treat dispensing opening 613 where the treat can come to rest within treat tray 614.

Algorithm for Detecting Waste

The device disclosed herein can be configured to determine when an animal has entered the waste station, and when an animal has departed the waste station leaving waste behind. Specifically, the system is configured to determine and maintain a baseline weight. This allows the system to understand the weight of the empty pad and is maintained as a baseline.

Figure 7:
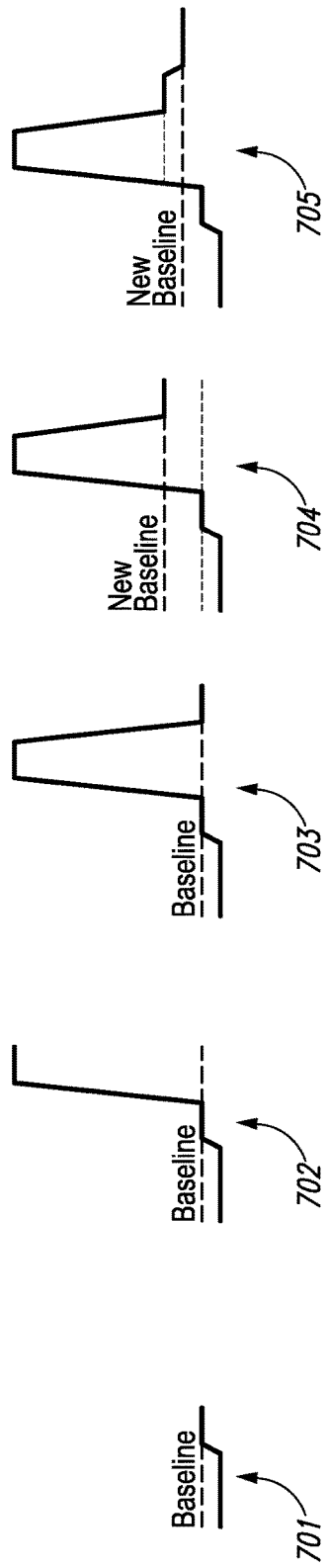
FIG. 7 depicts a weight detection algorithm to detect the presence of animal waste for use with a dog waste station as described in accordance with certain embodiments of the present disclosure.

FIG. 7 depicts one suitable algorithm for detecting animal waste 700. As shown at step 701, when an animal enters the station, the system detects the large increase of weight. This increase can be stored or recorded and causes the system to enter a monitoring mode, shown at step 702. This can be accompanied by a piece of feedback to indicate that the system is monitoring. In some embodiments an LED light may be utilized. when an animal exits the station, the system detects a large decrease in weight. The system can be configured to compare this decrease in weight to the original baseline. Based on this comparison, a determination can be made by the system.

For instance, an animal may leave the waste station without having eliminated therein as shown at step 703. In such scenarios, the system can be configured to determine that the new baseline is substantially identical to the old baseline. For instance, the new baseline could be exactly identical, or could be within a certain tolerance of the original baseline weight. The system can compare the original baseline weight to the new baseline weight and make a determination that the baseline weights are substantially identical and therefore the animal did not eliminate on the station.

In other circumstances, if the animal has left the waste station after eliminating, then the system will detect that the new baseline weight is higher than the initial baseline weight, as shown at step 704. The system can be configured to determine that the animal has eliminated on the waste station by detecting gram scale increases in the weight disposed across the pad.

Based on such a determination, the user can be alerted to come tend to the station and clean any mess that has been left behind, as shown at step 705. Further based on such a determination, the system can be configured to dispense no treats, one treat, a plurality of treats, or can be configured to randomize the treat output. For instance, the system can be configured to reward an animal for entering and exiting the station; for entering and eliminating on the station; or no reward can be provided. In some embodiments, the system can be configured to randomize and stagger rewards so that the animal will only be rewarded for a certain fraction of overall eliminations. The reward can be staggered in a predictable or random way depending on the user's goals.

Certain Terminology

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes, or tends toward, a particular value, amount, or characteristic. As an example, in certain embodiments, as the context may dictate, the term "generally parallel" can refer to something that departs from exactly parallel by less than or equal to 20 degrees and/or the term "generally perpendicular" can refer to something that departs from exactly perpendicular by less than or equal to 20 degrees.

Overall, the language of the claims is to be interpreted broadly based on the language employed in the claims. The claims are not to be limited to the non-exclusive embodiments and examples that are illustrated and described in this disclosure, or that are discussed during the prosecution of the application.

What is claimed is:

1. An animal waste station system, comprising an animal tampering resistant animal waste station configured to detect animal entry, animal elimination, and animal exit while configured to provide a food item in response, the tampering resistant animal waste station comprising:
   a surrounding enclosure and an elimination area;
      wherein the surrounding enclosure is configured to form a complete perimeter around an elimination area;
         wherein at least a portion of the surrounding enclosure extends over at least a portion of the top surface of the elimination area;
         wherein a lower portion of the surrounding enclosure fully encloses the underside of the elimination area;
            wherein the lower portion of the surrounding enclosure further includes a connecting segment extending beyond the perimeter of the elimination area;
         wherein the surrounding enclosure is further provided with a plurality of sidewalls extending vertically above the elimination area;
            wherein the plurality of sidewalls include a gap such that the sidewalls do not form a complete perimeter around the elimination area;
      wherein the elimination area is configured with multiple layers including:
         an absorbent layer configured to absorb moisture associated with elimination;
         a moisture impermeable layer configured to mitigate moisture egress;
         a support layer configured to facilitate an interface between the elimination area and a plurality of weight sensors configured to detect elimination;
      wherein each of the plurality of weight sensors includes a substantially square outer housing, the outer housing configured to interface with the support layer to facilitate an interface between the elimination area and the weight sensors;
      wherein the outer housing is configured to surround a sensor plunger to provide a gap between the sensor plunger and the outer housing;
      the substantially square outer housing including a notch in the top surface of each of the four sides;
         wherein each of the notches is configured to interface with a single member of a flexible lattice structure of the support laver; and
      wherein four members of the flexible lattice structure are configured to interface with the gap between the sensor plunger and the outer housing;
      a food item dispensing unit configured to house food items securely away from animal access and further configured to interface with a food item containing cassette;
         the food item dispensing unit is configured to couple with the animal tampering resistant animal waste station through the connecting segment of the lower portion of the surrounding enclosure;
         the food item dispensing unit including an opening to receive a food item containing cassette;
            wherein the food item dispensing unit opening is disposed proximate to the side of the food item dispensing unit that is adjacent to the surrounding enclosure;
         the food item dispensing unit including internal gears configured to operatively couple with the food item containing cassette; and
            wherein the food item containing cassette includes a hinged housing and an internal rotating member having a plurality of segments configured to hold a food item.

2. The waste station of claim 1, wherein the absorbent pad is disposable.

3. The waste station of claim 1, wherein the vertical walls have a height of 8-18 inches, or within 10% thereof.

4. The waste station of claim 1, wherein the portion of the surrounding enclosure extending over at least a portion of the top surface of the elimination area extends about 3 inches to 8 inches over the top surface along the perimeter of the elimination area, or within 10% thereof.

5. The waste station of claim 4, wherein a slope is formed between the vertical walls and the portion of the surrounding enclosure extending over at least a portion of the top surface of the elimination area such that liquids are routed down the vertical walls, down the slope and onto the elimination area.

6. The waste station of claim 1, wherein the support layer configured to facilitate an interface between the elimination area and a plurality of sensors configured to detect elimination includes a flexible lattice structure configured to interface with the plurality of sensors.

7. The waste station of claim 6, wherein the plurality of sensors includes a series of weight sensors.

8. The waste station of claim 7, wherein the elimination area is substantially square, and the series of weight sensors includes four weight sensors.

9. The waste station of claim 8, wherein the four weight sensors are evenly distributed, and each sensor is positioned within a corner region bounded by two imaginary boundary lines extending inward from the two sides that meet at the corner, each boundary line being spaced from its respective side by a distance no more than 30% of the side length of the substantially square elimination area.

10. The waste station of claim 9, wherein each of the four weight sensors includes an outer housing, the outer housing configured to interface with the support layer to facilitate an interface between the elimination area and the four weight sensors.

11. The waste station of claim 1, wherein the pad support tray is configured to float over the sensors to reduce the weight of the absorbent layer and the moisture impermeable layer across the sensors.

12. The waste station of claim 1, wherein the cassette includes the plurality of segments configured to house one or more food items, the plurality of segments configured to rotate within the cassette.

13. The waste station of claim 12, wherein the plurality of segments configured to house one or more food items includes 23 segments.

14. The waste station of claim 1, wherein the hinged housing of the food item containing cassette includes two internal access ports including a first internal access port providing access to one of the plurality of segments and a second internal access port providing access to notches disposed on the internal rotating member.

15. The waste station of claim 14, wherein the gears of the food item dispensing unit are configured to interface with the notches disposed on the internal rotating member of the cassette through the second access port in the housing of the cassette, and wherein the gears are configured to cause the cassette to rotate.

16. The waste station of claim 15, wherein the food item dispensing unit includes a sensor to determine the type or presence of food item housed within one of the plurality of segments of the cassette.

17. An automatic animal waste station configured to detect the entry, elimination, and exit of an animal, the waste station comprising:
   an elimination area;
   a surrounding enclosure;
   a plurality of weight sensors;
   wherein the waste station is configured to determine a first baseline weight of the elimination area;
   wherein the waste station is configured to monitor the weight of the elimination area;
   wherein the waste station is configured to detect a substantial increase in the weight of the elimination area;
   wherein the waste station is configured to monitor for a substantial decrease in the weight of the elimination area to obtain a second baseline weight;
   wherein the waste station is configured to compare the first baseline weight to the second baseline weight to determine whether an animal has eliminated within the elimination area;
   a cassette configured to be cycled in response to a determination that an animal has eliminated within the elimination area,
   wherein the cassette, when cycled, can provide no food item, one food item, or a plurality of food items; and
   wherein each of the plurality of weight sensors includes a substantially square outer housing, the outer housing configured to interface with the support layer to facilitate an interface between the elimination area and the weight sensors;
   wherein the outer housing is configured to surround a sensor plunger to provide a gap between the sensor plunger and the outer housing;
   the substantially square outer housing including a notch in the top surface of each of the four sides;
   wherein each of the notches is configured to interface with a single member of a flexible lattice structure of the support layer; and
wherein four members of the flexible lattice structure are configured to interface with the gap between the sensor plunger and the outer housing.

* * * * *